United States Patent
Jenne et al.

(10) Patent No.: US 6,324,837 B1
(45) Date of Patent: Dec. 4, 2001

(54) UNCOUPLING ELEMENT FOR UNCOUPLING VIBRATIONS

(75) Inventors: Ekkehard Jenne, Knittlingen; Michael Koob, München, both of (DE)

(73) Assignee: Witzenmann GmbH Metallschauch-Fabik Pforzheim, Pforzheim (DE)

( * ) Notice: Subject to any disclaimer, the term of this patent is extended or adjusted under 35 U.S.C. 154(b) by 0 days.

(21) Appl. No.: 09/498,217

(22) Filed: Feb. 4, 2000

(30) Foreign Application Priority Data

| Feb. 5, 1999 | (DE) | 299 01 957 U |
| Apr. 29, 1999 | (DE) | 299 07 590 U |

(51) Int. Cl.$^7$ .................................................. F01N 7/10
(52) U.S. Cl. ..................... 60/322; 60/323; 138/109; 138/121; 285/300; 285/49
(58) Field of Search .................... 60/322, 323, 272; 138/109, 121; 285/299, 300, 301, 406, 364, 49

(56) References Cited

U.S. PATENT DOCUMENTS

| 3,169,785 | 2/1965 | Ziebold . | |
| 4,659,117 | * 4/1987 | Holzhausen et al. | 285/49 |
| 4,875,716 | * 10/1989 | Winzen et al. | 285/137.1 |
| 5,340,165 | * 8/1994 | Sheppard | 285/226 |
| 5,882,046 | * 3/1999 | Thomas | 285/226 |
| 5,924,282 | * 7/1999 | Thomas | 60/323 |
| 5,967,565 | * 10/1999 | Kim | 285/49 |
| 6,086,110 | * 7/2000 | Lee et al. | 285/49 |
| 6,164,703 | * 12/2000 | Kim | 285/49 |

FOREIGN PATENT DOCUMENTS

| 34 28 449 A1 | 2/1986 | (DE) . |
| 0 226 088 A1 | 6/1987 | (EP) . |

* cited by examiner

Primary Examiner—Thomas Denion
Assistant Examiner—Binh Tran
(74) Attorney, Agent, or Firm—Akin, Gump, Strauss, Hauer & Feld, L.L.P.

(57) ABSTRACT

An uncoupling element is proposed for uncoupling vibrations in an exhaust gas conduit of an internal combustion engine, having a screw thread-shaped or annular waved, metal corrugated hose, which is inserted between a first conduit element arranged upstream and a second conduit element arranged downstream. In order to combine a good uncoupling action with ease of installation and repair friendliness, the uncoupling element is configured such that the first conduit element arranged upstream is provided with an annular bulge in the region of its end to be connected to the corrugated hose, that the first conduit element, downstream from the annular bulge, continues into a flame pipe reaching into the corrugated hose, without touching the inner waves of the corrugated hose, that in the transition region between annular bulge and flame pipe a centering surface is provided, and that the corrugated hose is separably connected with the first conduit element on the annular bulge via a clamp connection, while it lies against the centering surface.

10 Claims, 1 Drawing Sheet

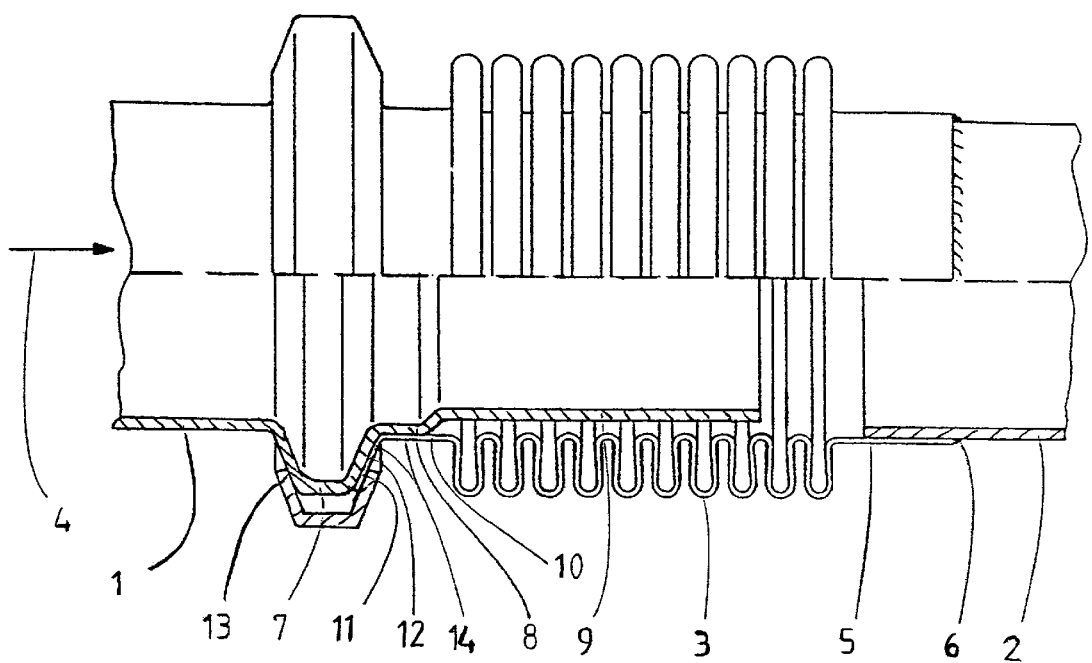

UNCOUPLING ELEMENT FOR UNCOUPLING VIBRATIONS

BACKGROUND OF THE INVENTION

The invention relates to an uncoupling element for uncoupling vibrations in an exhaust gas conduit of an internal combustion engine, having a screw thread-shaped or annular waved, metallic corrugated hose, which is installed between a first conduit element arranged upstream and a second conduit element arranged downstream.

With exhaust gas conduits of motor vehicles, it is known to install a flexible conduit element in the form of waved, corrugated hose as an intermediate part, in order to absorb motions and vibrations and to uncouple transmission to adjacent components. Such motions and vibrations result on the part of the elastically mounted drive mechanism as a consequence of load shifting reactions in normal driving operation or also as temperature-conditioned changes in length within the exhaust gas conduit. Transmission of these motions and vibrations to the vehicle should be prevented as far as possible, in order to increase the lifetime of the exhaust gas facility and to prevent undesirable transmission of body noise, as well as the emission of air noise.

An example of such a flexible conduit element for exhaust gas conduits of motor vehicles may be taken from German utility model DE 296 09 293 U1. The conduit element described there is firmly connected with the conduit elements lying upstream and downstream, usually by means of a welding connection. For bracing in the axial direction, the corrugated hose is enclosed by a knit hose fastened on both ends of the corrugated hose. In the cited utility model, it is moreover proposed to additionally enclose the knit hose with a netting hose.

Such a known uncoupling element is indeed gas-tight and internally stable, but the installation of this conduit element in the exhaust gas facility by the motor vehicle manufacturer must be conducted very carefully. Fastening of the connection ends of the corrugated hose may be undertaken only within narrow tolerances. Even the replacement of a corrugated hose, which has possibly become harmful, requires exact processing by the workshop entrusted with it, as well as good capabilities in metalworking.

As an alternative to permanent installation of a conduit element just mentioned, it is known according to the prior art, for example from German published patent application DE 35 42 684 A1, to separably connect the exhaust manifold of a motor vehicle engine with a following corrugated hose. In this publication, the connection is undertaken by means of a sealing ring of slightly pre-stressed material, such as metal wires or metal shavings, which is arranged on the cylindrical running-out tube end and on which a bent collar of the corrugated hose is laid, wherein a profile clamp braces the collar together with the sealing ring on the tube end. It has become apparent though, that the uncoupling action of such a separable construction is capable of improvement. Also, a corrugated hose with good uncoupling action can hardly be joined in this manner with the tube end of a conduit element of an exhaust gas facility close to the engine.

SUMMARY OF THE INVENTION

Underlying the present invention is therefore the object of proposing an uncoupling element for uncoupling vibrations in an exhaust gas conduit of an internal combustion engine having a screw thread-shaped or annular waved metal corrugated hose, which combines a good uncoupling action with easy installation and repair friendliness.

In accordance with the invention, an uncoupling element of the type mentioned at the beginning is configured such that the first conduit element, arranged upstream in the region of its end to be connected with the corrugated hose, is provided with an annular bulge, that the first conduit element, downstream of the annular bulge, continues into a flame pipe which reaches into the corrugated hose without touching the inner waves of the corrugated hose, that in the transition region between the annular bulge and the flame pipe a centering surface is provided, and that the corrugated hose is separably connected with the first conduit element on the annular bulge by means of a clamp connection, while it lies against the centering surface.

The annular bulge on the first conduit element makes possible a very easy installation of the uncoupling element, wherein the fitter need not pay attention to the exact position of the clamp connection, since this is pre-determined by the annular bulge, and also ensures later an easy separability for repair purposes.

Downstream of the annular bulge, the first conduit element continues into a flame pipe which reaches into the corrugated hose and to this extent serves as a heat shield for the corrugated hose and, since the wave form of the corrugated hose could lead to flow disturbances, serves for better flow guidance. Moreover, the flame pipe has an external diameter dimensioned such that it does not touch the interior waves of the of the corrugated hose, and indeed not even when angular motions occur, owing to relative motions within the exhaust gas facility. After the flame pipe is constructed as a continuation of the first conduit element arranged upstream, its position relative to the first conduit element is unalterable, so that the corrugated hose can simply be put on over the flame pipe and fastened on the clamp connection. Moreover, the centering surface provided in accordance with the invention guarantees therein, in any case, an exact and nonetheless easy installation, wherein the spacing between the flame pipe and the internal waves of the corrugated hose, necessary for avoiding rattling noises, can be automatically maintained.

The centering surface finally forces, in interaction with the annular bulge, a centering of the corrugated hose relative to the first conduit element in all three spatial directions. Errors owing to inexact processing in the installation are thus largely ruled out per se.

Preferably, the flame pipe is formed in one piece on the first conduit element, wherein, as a rule, it will have an outer radius diminished in relation to the first conduit element.

The clamp connection of the corrugated hose on the first conduit element can be undertaken in usual manner by means of an installable profile clamp adapted to the annular bulge. Expediently, the annular bulge is here constructed as a V-shaped rim and the profile clamp as a V-shaped clamp. The clamp connection can then be made gas-tight in a simple manner, in that the corrugated hose is provided on its end facing the first conduit element with an annular flanged, outwardly conical-shaped collar, wherein the annular bulge of the first conduit element has a mating conical seating surface for the collar, and the collar is thus braceable with the annular bulge by placing on and tightening the profile clamp.

The conical seating surface of a thus-configured clamp surface can serve as part of the centering surface, for the seating of the flanged collar of the corrugated hose end on such a conical surface inherently insures the desired centering according to the invention in all three directions.

In order to facilitate the installation of the uncoupling element and to increase its accuracy, the centering surface preferably includes a cylindrical shoulder arranged between the annular bulge and the flame pipe.

To diminish the inherent ability of the corrugated hose to vibrate, the corrugated hose can be constructed with multiple walls, preferably with three wall layers. The friction between the individual wall layers, in connection with vibratory motions of the corrugated hose, provides for the internal damping of these motions.

The invention displays particular advantages when the corrugated hose has a high internal rigidity, and indeed such that its internal frequency lies higher than the excitation frequency of the internal combustion engine and/or of its auxiliary units. Especially because the danger of resonance vibrations is hereby eliminated, an additional damping of the corrugated hose by a knit jacket or a knit hose is dispensable. This makes it possible for the overall construction—when the corrugated hose itself is so manufactured that it has a substantially linear vibration behavior—to manifest a linear vibration behavior: Even the connection of the corrugated hose to the first conduit element lying upstream, using the clamp connection of the invention arranged on the annular bulge, generates no non-linearities of any kind, since the transition from the first conduit element to the annular bulge and from the annular bulge to the corrugated hose is not encumbered with an internal damping.

In contrast, with conduit elements according to the prior art mentioned at the outset, non-linearities have not been avoidable up until now, either by the knit hose enclosing the corrugated hose or by the clamping taking place by an elastic ring, so that the known uncoupling elements or pipe connection elements have generally always had up until now a non-negligible, non-linear vibration behavior.

Since the motor vehicle industry, in particular, strives to shorten the development times for new products and for this purpose to undertake as many development steps as possible by means of computer simulation, a linear vibration behavior of the vehicle parts, in particular of the exhaust gas facility as well, can be desirable. For only then can a result be reached through computer simulation, which to a sufficient extent corresponds to reality.

The particularly advantageous configuration of the invention obviously does not rule out that it can be expedient for particular applications to enclose the corrugated hose with a weave and/or a knit in known manner.

BRIEF DESCRIPTION OF THE SEVERAL VIEWS OF THE DRAWINGS

An embodiment of the invention will be described below on the basis of the accompanying drawing and explained in greater detail.

The accompanying sole FIGURE is a partial sectional side view of an uncoupling element according to the present invention.

DETAILED DESCRIPTION OF THE INVENTION

Between a first conduit element 1 lying upstream and a second conduit element 2 lying downstream in an exhaust gas facility of a motor vehicle combustion engine, a ring-waved corrugated hose 3 is inserted, in order to uncouple vibrations and to compensate for relative motions of the two conduit elements 1 and 2. The flow direction of the exhaust gases is designated with the reference numeral 4. The corrugated hose 3 is provided downstream with a cylindrical connection end 5 formed in one piece, which is slid onto the second conduit element 2 and fastened to this by means of a welding seam 6.

The first conduit element 1 is deformed into a V-shaped annular bulge 7 in the region of its end to be connected to the corrugated hose 3, and then continues downstream over a cylindrical shoulder 8 into a flame pipe 9 with a diminished outer radius. The flame pipe 9 extends into the interior of the corrugated hose 3 and thus protects it against the hot exhaust gases. Furthermore, the flame pipe 9 improves the through flow of the uncoupling element, in that the gas flow is surrounded with a smooth interior pipe wall. The flame pipe 9 is so dimensioned that, between its end and the second conduit element 2 as well as between its outer wall and the inner waves of the corrugated hose 3, respectively, a clear space remains which guarantees, with all usually occurring relative motions of the two conduit elements 1 and 2, that the flame pipe 9 does not strike against the inner waves of the corrugated hose 3 or against the second conduit element 2.

The connection of the corrugated hose 3 to the first conduit element 1 takes place via a separable clamp connection. This is formed such that the corrugated hose 3 also has on its upstream-lying end a hollow cylindrical connection piece 10 formed in one piece, which is provided on its end with a conically flanged annular collar 11. Toward the corrugated hose 3 the annular bulge 7 has a mating conical seating surface 12 for the collar 11, against which the collar 11 is placed. By means of a V-shaped profile clamp 13, which is placed upon the annular bulge, the collar 11 of the corrugated hose 3 is braced gas-tight with the annular bulge 7 of the first conduit element 1.

As can be well recognized in the drawing, the cylindrical shoulder 8 of the first conduit element 1 and the seating surface 12 of the annular bulge 7 together form a centering surface 14 for the corrugated hose 3, which in the shown, fully-installed state lies with its connection piece 10 and its flanged collar 11 against the centering surface 14, and is thereby centered in all three spatial dimensions.

It can be recognized how simply and nonetheless precisely the installation of the uncoupling element according to the invention takes place: The corrugated hose 3, which is already welded with the second conduit element 2, is placed over the flame pipe 9, wherein the flanged collar 11 of the upstream-lying connection piece 10 of the corrugated hose 3 optionally serves as a catch incline. The flame pipe 9 then broadens into the cylindrical shoulder 8, on which the connection piece 10 is slid, until its flanged collar 11 comes to lie against the seating surface 12 of the annular bulge 7. In this way, the flame pipe 9 is centered by itself into the correct installation position inside the corrugated hose 3. Finally, it is only left to set the profile clamp 13 on the annular bulge 7 and to brace it there, in order to complete the installation.

What is claimed is:

1. An uncoupling element for uncoupling vibrations of an exhaust gas conduit of an internal combustion engine, having a screw thread-shaped or annular waved, metal corrugated hose, which is inserted between a first conduit element (1) arranged upstream and a second conduit element (2) arranged downstream, characterized in that the first conduit element (1) is provided with an annular bulge (7) in a region of its end to be connected to a corrugated hose (3), in that the first conduit element (1), downstream from the annular bulge (7), continues into a flame pipe (9) extending into the corrugated hose (3), wherein the flame pipe (9) is formed in one piece on the first conduit element (1), in that a centering surface (14) is provided in the transition region between the annular bulge (7) and the flame pipe (9), and in that the corrugated hose (3) is separably connected with the first conduit element (1) on the annular bulge (7) via a clamp connection (7, 11, 13), while it lies against the centering surface (14).

2. The uncoupling element according to claim 1, characterized in that the clamp connection is produced by a profile clamp (13) shaped for set mating on the annular bulge (7).

3. The uncoupling element according to claim 2, characterized in that the annular bulge (7) is constructed as a V-shaped rim and the profile clamp (13) as a V-shaped clamp.

4. The uncoupling element according to claim 2 characterized in that the corrugated hose (3) is flanged on its end facing the first conduit element (1) into an outwardly conical, annular collar (11), and in that the annular bulge (7) of the first conduit element (1) has a mating conical seating surface (12) for the collar (11), wherein the collar (11) is braceable with the annular bulge (7) via the profile clamp (13).

5. The uncoupling element according to claim 4, characterized in that the conical seating surface (12) is part of the centering surface (14).

6. The uncoupling element according to claim 1, characterized in that the centering surface (14) includes a cylindrical shoulder (8) arranged between the annular bulge (7) and the flame pipe (9).

7. The uncoupling element according to claim 1, characterized in that the corrugated hose (3) is constructed with multiple walls.

8. The uncoupling element according to claim 1, characterized in that the corrugated hose (3) has a high internal rigidity, so that its own frequency lies higher than at least one of the excitation frequencies of the internal combustion engine and its auxiliary units.

9. The uncoupling element according to claim 8, characterized in that the corrugated hose (3) has a substantially linear vibration behavior.

10. The uncoupling element according to claim 1, characterized in that the corrugated hose (3) is enclosed in at least one of a weave and a knit.

\* \* \* \* \*